G. H. STROUD & J. A. SHUMAN.
Tire-Shrinker.
No. 222,545. Patented Dec. 9, 1879.
Fig: 1.
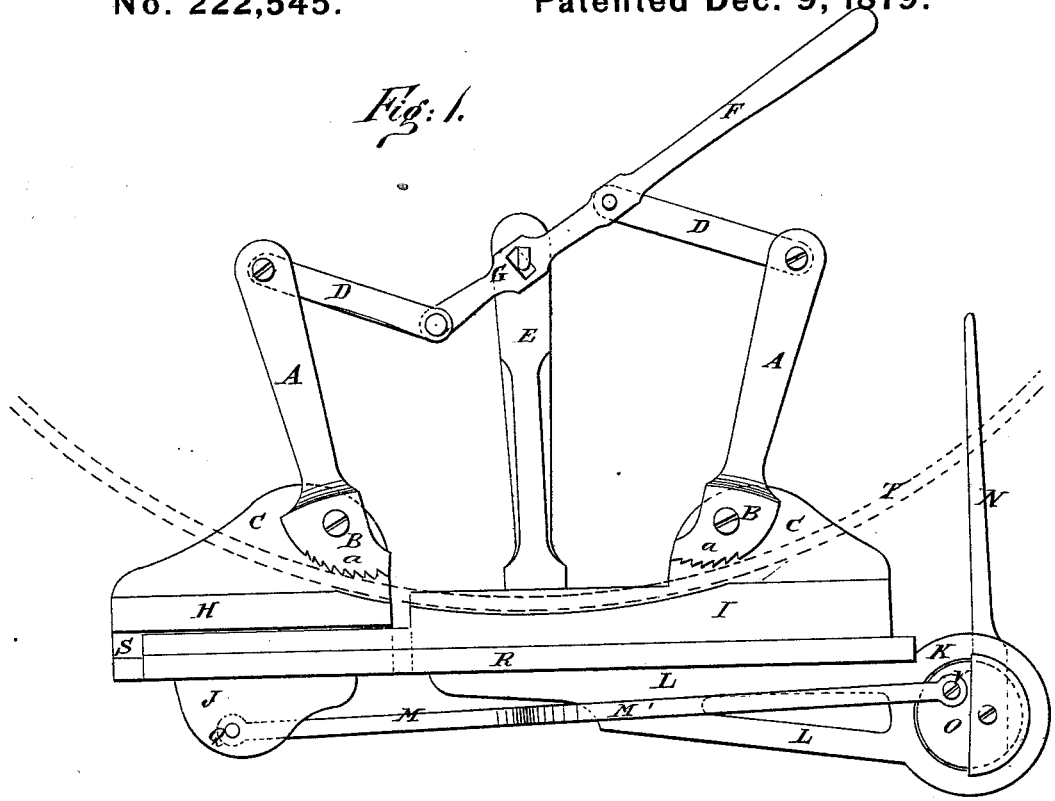
Fig: 2.
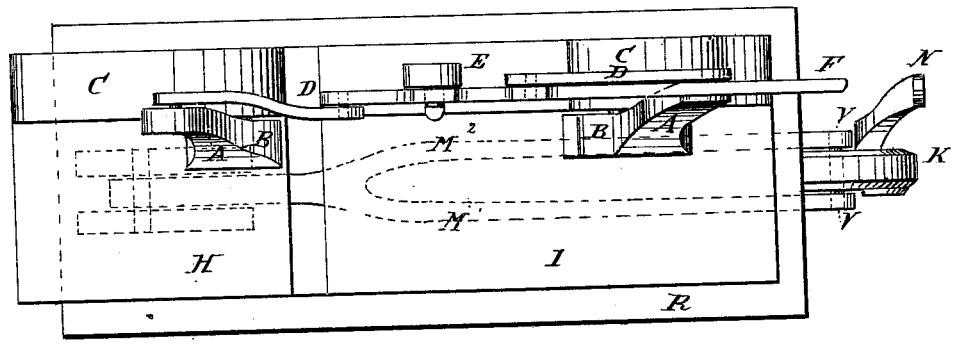
WITNESSES:
Chas Nida
C. Sedgwick
INVENTOR:
G. H. Stroud
J. A. Shuman
BY Munn & Co
ATTORNEYS.

UNITED STATES PATENT OFFICE.

GEORGE H. STROUD AND JOHN A. SHUMAN, OF SUGAR RUN, PA.

IMPROVEMENT IN TIRE-SHRINKERS.

Specification forming part of Letters Patent No. 222,545, dated December 9, 1879; application filed May 29, 1879.

*To all whom it may concern:*

Be it known that we, GEORGE H. STROUD and JOHN A. SHUMAN, of Sugar Run, in the county of Bradford and State of Pennsylvania, have invented a new and Improved Tire-Shrinker, of which the following is a specification.

The object of our invention is to provide a tire-shrinker that will work effectually, and yet require no great exertion of power.

The invention consists in combining with a movable plate and jaws a forked connecting-rod, pivoted to the jaws, and a lever-operated disk, as hereinafter described.

In the drawings, Figure 1 shows an elevation; Fig. 2, a plan view.

Similar letters of reference indicate corresponding parts.

H and I are the two plates upon which the tire is laid. I is securely fixed to the bed-plate R, but H is movable on the bed-plate, and is guided and held in position by means of the grooves S. Each of the plates H and I is provided with an ear, C, to which the clamp A, provided with teeth $a\ a$, is pivoted at B. These clamps are operated by a lever, F, pivoted to the upright E at G by means of a pin and a slot. The slot is provided to permit of the plates I and H being moved without causing a loosening of the clamps.

D D are arms connecting the lever F and the clamps A A. The plates H and I have a curved hollow or recess, into which the tire fits.

To the lower side of the movable plate H are fastened the jaws J, between which, at Q, one end of the forked connection-rod M is pivoted.

To the lower side of the bed-plate R the ear L, which ends in the ring K, is fastened. In this ring is the disk O, to which the other end of the forked connection-rod M is pivoted at V, so that the disk O and the ear L lie between the two prongs $M'$ and $M^2$. This disk O is turned by a lever, N, which is fastened to it.

The operation is as follows: The tire that is to be shrunk is heated and then placed on the recessed part of the two plates H and I, and are held down tight by raising the lever F. The upper ends of the clamps A A will be drawn toward each other, and the lower ends, which are provided with the teeth, will separate, and will firmly hold the tire to the plates H and I. Before securing the tire in position, however, the two plates H and I are separated as much as may be necessary, more or less, according to the shrinkage of the tire, by raising the lever N. To shrink the tire the lever N is depressed. This causes the two plates H and I to be drawn toward each other by means of the connecting-rod M.

With very little exertion very strong tires can be shrunk in a very short time.

The apparatus is very simple and plain, and nothing in it that can get out of order. As the lever F is slotted at G, it will not turn when the parts H and I are drawn toward each other, and the clamps will not loosen their hold on the tire.

Having thus described our invention, we claim as new and desire to secure by Letters Patent—

The combination, with the movable plate H and jaws J, of the forked connecting-rod M, pivoted to jaws at Q, and the disk O, operated by a lever, N, as and for the purpose specified.

GEORGE H. STROUD.
JOHN A. SHUMAN.

Witnesses:
H. A. BARTLETT,
WALLACE DODGE.